3,335,136
HALOPHENYLMERCAPTOMETHYL CEPHALOSPORINS

Edwin H. Flynn, Indianapolis, Ind., assignor to Eli Lilly and Company, Indianapolis, Ind., a corporation of Indiana
No Drawing. Filed Dec. 27, 1965, Ser. No. 516,670
8 Claims. (Cl. 260—243)

This application is a continuation-in-part of my application Ser. No. 99,998, filed Apr. 3, 1961, now abandoned.

This invention relates to novel antibiotic substances and to methods for their preparation and use.

The novel compounds of the present invention are improved 7-mercaptoacetamido derivatives of cephalosporanic acid, having the following formula:

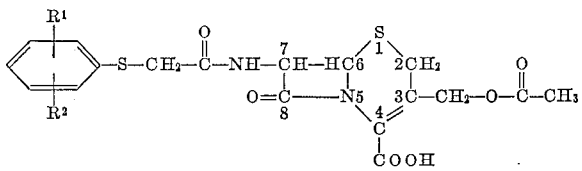

and the salts thereof with pharmaceutically acceptable cations, in which $R^1$ is chloro, bromo, or trifluoromethyl; and
$R^2$ is hydrogen, methyl, fluoro, chloro, bromo or trifluoromethyl; and
$R^1$ and $R^2$ are located at any position on the phenyl ring.

The compounds of the present invention are highly effective antibacterial agents, being orally absorbed and lower in median effective dose against hemolytic streptococci than the 7-mercaptoacetamido cephalosporins of the prior art. They are characterized by penicillinase-resistance, acid stability, and activity against a broad range of microorganisms, including both Gram-positive and a number of the Gram-negative pathogens. They are conveniently prepared and administered in the form of the salts of the carboxyl group with pharmaceutically acceptable cations, including, for example, water-soluble salts such as the sodium, potassium, lithium, ammonium, and substituted ammonium salts, as well as the less water-soluble salts such as the calcium, barium, procaine, quinine, and dibenzylethylenediamine salts. Administration is preferably by intramuscular injection in isotonic saline at a dose (for adults) around 0.25 to 0.50 g. every four to six hours. Oral administration generally requires a somewhat higher dosage, from 0.50 to 1.0 g. every four to six hours, and can be carried out in the form of pressed tablets, filled gelatin capsules, or suspensions of conventional type or the like.

The following examples will illustrate the compounds available in accordance with the present invention:

7-o-chlorophenylmercaptoacetamidocephalosporanic acid
7-m-bromophenylmercaptoacetamidocephalosporanic acid
7-o-bromophenylmercaptoacetamidocephalosporanic acid
7-m-trifluoromethylmercaptoacetamidocephalosporanic acid
7-(2',6'-dichlorophenylmercaptocetamido)cephalosporanic acid
7-(2',3'-dichlorophenylmercaptoacetamido)cephalosporanic acid
7-(2',5'-dibromophenylmercaptoacetamido)cephalosporanic acid
7-(2'-chloro-4'-bromophenylmercaptoacetamido)cephalosporanic acid
7-(2'-methyl-4'-bromophenylmercaptoacetamido)cephalosporanic acid
7-(2'-fluoro-4'-bromophenylmercaptoacetamido)cephalosporanic acid
7-(2'-fluoro-4'-trifluoromethylphenylmercaptoacetamido)cephalosporanic acid
7-(2',4'-bis[trifluoromethyl]phenylmercaptoacetamido)cephalosporanic acid
7-(3'-fluoro-4'-chlorophenylmercaptoacetamido)cephalosporanic acid The source material for the compounds of the present invention is cephalosporin C, more precisely known as 7-(5'-aminoadipamido)cephalosporanic acid, which can be prepared by cultivating a cephalosporin C-producing organism in a suitable nutrient medium, as described in British patent specification 810,196, published Mar. 11, 1959.

Cephalosporin C is readily converted into the corresponding nucleus compound, 7-aminocephalosporanic acid, by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al. described in U.S. Pat. 3,188,311 (June 8, 1965).

The nucleus thus obtained is conveniently converted into a 7-acylamidocephalosporanic acid as desired by acylation. For this purpose, any of the conventional acylation procedures can be employed, utilizing any of the various types of known acylating agents having the compositon which yields the desired side chain. A convenient acylating agent is the appropriate acyl chloride or bromide. The acylation is carried out in water or an appropriate organic solvent, preferably under substantially neutral conditions, and preferably at reduced temperaure, i.e., above the freezing point of the reaction mixture and up to about 20° C. In a typical procedure, 7-aminocephalosporanic acid is dissolved in water with a sufficient quantity of sodium bicarbonate or other appropriate alkali to promote solution, the concentration of the 7-aminocephalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued and the mixture is allowed to warm to room temperature. The reaction product is then acidified to around pH 2 and extracted with an organic solvent such as ethyl acetate. The ethyl acetate extract is back-extracted with water at pH 5.5 to 6, employing for pH adjustment a base containing the cation of the desired final product. The water solution is separated and evaporated substantially to dryness. The residue is taken up in a minimum quantity of water and the acylation product is precipitated by adding a large excess of acetone, and if necessary, ether. The crystalline product obtained thereby is filtered, washed with acetone, and dried.

The acylation can also be carried out with the corresponding carboxylic acid, employed in conjunction with an equimolar proportion of a carbodiimide such as N,N'-diisopropylcarbodiimide, N,N'-dicyclohexylcarbodiimide, N,N'-bis(p-dimethylaminophenyl)carbodiimide, N-ethyl-N'-(4''-ethylmorpholinyl)carbodiimide, or the like, and the acylation proceeds at ordinary temperatures in such cases. Alternatively, the carboxylic acid can be converted into the corresponding acid anhydride, or into the azide, or into an activated ester, and any of these derivatives can be used to effect the desired acylation. Other agents can readily be ascertained from the art.

The acylating agents required in the preparation of the compounds of the present invention are readily obtained by methods well known in the art.

The invention will be more readily understood from the following operating examples, which are submitted as illustrations only, and not by way of limitation. X-ray powder diffraction data were obtained using nickel-filtered copper radiation of 1.5405 A.U. wavelength and a De Bye-Scherrer camera.

Example 1

7-aminocephalosporanic acid (1.0 g.) was suspended in 50 ml. of water and dissolved by adding sodium bicarbonate (1.0 g.). Acetone (50 ml.) was then added, and the solution was coloed to 5° C. and stirred while 0.82 g. of p-chlorophenylmercaptoacetyl chloride in 15 ml. of acetone was added dropwise over a period of one hour. Stirring was continued for one hour at 5° C. and the acetone was then removed by evaporation in a rotating-flask evaporator under vacuum at ordinary temperature. Ethyl acetate (75 ml.) was added, followed by hydrochloric acid to pH 2. After thorough mixing, the layers were separated. The ethyl acetate phase was back-extracted with 75 ml. of water and a sufficient quantity of aqueous 1 N potassium hydroxide solution to reach pH 5.5. The water layer was separated and evaporated to a semisolid in a rotating-flask evaporator under vacuum at ordinary temperature. The residue was dissolved in methanol, diluted with isopropyl alcohol, and stripped substantially free of solvent. The potassium salt of 7-p-chlorophenylmercaptoacetamidocephalosporanic acid was obtained thereby as a white powder weighing 660 mg. and having a maximum in its ultraviolet spectrum at 255 m$\mu$ ($\epsilon=14{,}360$). The powdered material exhibited the following X-ray diffraction pattern:

| $d$:  | $I/I_1$ |
|-------|---------|
| 14.71 | 1.00    |
| 8.54  | .20     |
| 7.55  | .30     |
| 5.73  | .30     |
| 5.06  | .40     |
| 4.59 a | .40    |
| 4.42 a | .40    |
| 4.01 a | .30    |
| 3.84 a | .30    |
| 3.66  | .30     |
| 3.51  | .20     |
| 3.39  | .30     |
| 3.22  | .20     |
| 3.09  | .20     |
| 3.00  | .20     |
| 2.81  | .20     |
| 2.68  | .20     |
| 2.52  | .05     |
| 2.30  | .10     |
| 2.14  | .05     |
| 1.937 | .05     |
| 1.829 | .05     |
| 1.738 | .05     | a Indicates broad line.

The product had a median effective dose (ED$_{50}$) against hemolytic streptococci in mice of 20.6 mg./kg.×2.

Example 2

7 - o-trifluoromethylphenylmercaptoacetamidocephalosporanic acid was prepared as the potassium salt by reacting 7-aminocephalosporanic acid (1.0 g.) sodium bicarbonate (1.0 g.), and o-trifluoromethylphenylmercaptoacetamido chloride (0.94 g.) according to the procedure and under the conditions of Example 1. The product weighed 820 mg. and had a maximum in its ultraviolet absorption spectrum at 253 m$\mu$ ($\epsilon=11{,}650$). The powdered material exhibited an X-ray diffraction pattern as follows:

| $d$:  | $I/I_1$ |
|-------|---------|
| 11.47 | 1.00    |
| 10.45 | .27     |
| 9.11  | .40     |
| 8.15  | 1.00    |
| 7.16  | .27     |
| 6.36  | 1.00    |
| 5.71  | .67     |
| 5.17  | .27     |
| 4.75  | .67     |
| 4.61  | .67     |
| 4.41  | 1.00    |
| 4.27  | 1.00    |
| 4.14  | .67     |
| 3.99  | .67     |
| 3.82  | .67     |
| 3.67  | 1.00    |
| 3.59  | .67     |
| 3.45  | .27     |
| 3.33  | .53     |
| 3.21  | .67     |
| 3.09  | .27     |
| 2.97  | .67     |
| 2.82  | .27     |
| 2.71  | .13     |
| 2.66  | .07     |
| 2.60  | .40     |
| 2.44  | .13     |
| 2.34  | .13     |
| 2.30  | .13     |
| 2.23  | .13     |
| 2.14  | .13     |
| 2.09  | .07     |
| 2.04  | .13     |
| 1.875 | .07     |
| 1.814 | .07     |
| 1.759 | .07     |
| 1.689 | .07     |
| 1.635 | .07     |

The product had a median effective dose (ED$_{50}$) against hemolytic streptococci in mice of 24.6 mg./kg.×2.

Example 3

7-(3'-chloro - 2' - methylphenylmercaptoacetamido) cephalosporanic acid was prepared as the potassium salt by reacting 7-aminocephalosporanic acid (1.0 g.), sodium bicarbonate (1.0 g.), and (3'-chloro-2'-methylphenyl) mercaptoacetyl chloride (0.87 g.) according to the procedure and under the conditions of Example 1. The product weighed 570 mg. and had a maximum in its ultraviolet absorption spectrum at 252 m$\mu$ ($\epsilon=11{,}240$). It had a median effective dose (ED$_{50}$) against hemolytic streptococci in mice of 28.9 mg./kg.×2.

Example 4

7-(5' - chloro - 2' - methylphenylmercaptoacetamido) cephalosporanic acid was prepared as the potassium salt by reacting 7-aminocephalosporanic acid (1.0 g.), sodium bicarbonate (1.0 g.), and (5'-chloro-2'-methylphenyl)mercaptoacetyl chloride (0.87 g.) according to the procedure and under the conditions of Example 1. The product weighed 610 mg. and had a maximum in its ultraviolet absorption spectrum at 249 m$\mu$ ($\epsilon=11{,}450$). It had a median effective dose (ED$_{50}$) against hemolytic streptococci in mice of 11.3 mg./kg.×2.

Example 5

7-aminocephalosporanic acid (1.0 g.) and sodium bicarbonate (1.2 g.) were dissolved in approximately 50 percent aqueous acetone. The solution was cooled in an ice bath, and 2,4-dichlorophenylmercaptoacetyl chloride (0.945 g., dissolved in a minimum quantity of acetone) was added with a stirring over a period of 45 minutes, after which the stirring was continued for 2.5 hours while the mixture warmed to room temperature. The acetone was then stripped out at ordinary temperature, employing a rotating-flask evaporator at reduced pressure. The resulting aqueous solution was acidified to pH 2.0 with concentrated hydrochloric acid and extracted with ethyl acetate. The ethyl acetate phase was separated, adjusted to pH 5.5 with 0.5 N aqueous potassium hydroxide solution, and extracted with water. The aqueous extract was separated and evaporated to dryness at room temperature and reduced pressure. The residue was dissolved in the minimum quantity of water and diluted with a large excess of acetone. The resulting crystalline precipitate was filtered off, washed with acetone, and again dissolved and precipitated, after which it was dried.

The product was the potassium salt of 7-(2',4'-dichlorophenylmercaptoacetamido)cephalosporanic acid, weighing 0.88 gram, having a maximum in its ultraviolet absorption spectrum at 256 m$\mu$ ($\epsilon$=15,040), and a median effective dose (ED$_{50}$) against hemolytic streptococci in mice of 11.3 mg./kg.×2.

*Example 6*

7-p-bromophenylmercaptoacetamidocephalosporanic acid was prepared as the potassium salt by reacting 7-aminocephalosporanic acid (1.088 g.), sodium bicarbonate (672 mg.), and p-bromophenylmercaptoacetyl chloride (1.00 g.) according to the procedure and under the conditions of Example 5, the final product being obtained by triturating the crude reaction residue with acetone, filtering, washing with acetone, and drying. The product weighed 650 mg. and had a maximum in its ultraviolet absorption spectrum at 256 m$\mu$ ($\epsilon$=14,350). It had a median effective dose (ED$_{50}$) against hemolytic streptococci in mice of 18.7 mg./kg.×2.

*Example 7*

7-m-chlorophenylmercaptoacetamidocephalosporanic acid was prepared as the potassium salt by reacting 7-aminocephalosporanic acid (544 mg.), sodium bicarbonate (336 mg.), and m-chlorophenylmercaptoacetyl chloride (400 mg.) according to the procedure and under the conditions of Example 5, the final product being obtained by triturating the crude reaction residue with acetone, filtering, washing with acetone, and drying. The product weighed 500 mg. and had a maximum in its ultraviolet absorption spectrum at 254 m$\mu$ ($\epsilon$=12,000). It had a median effective dose (ED$_{50}$) against hemolytic streptococci in mice of 18.7 mg./kg.×2.

While the invention has been illustrated by reference to certain specific embodiments thereof, it will be understood that a variety of modifications will be readily apparent to those skilled in the art, and such modifications are to be considered as lying within the scope of the invention.

I claim:
1. An antibiotic substance having the formula:

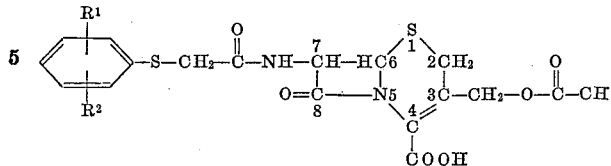

wherein

R$^1$ is chloro, bromo, or trifluoromethyl; and
R$^2$ is hydrogen, methyl, chloro;

and the salts thereof with pharmaceutically acceptable cations.

2. An antibiotic substance as in claim 1, said antibiotic substance being 7-p-chlorophenylmercaptoacetamidocephalosporanic acid.

3. An antibiotic substance as in claim 1, said antibiotic substance being 7-o-trifluoromethylphenylmercaptoacetamidocephalosporanic acid.

4. An antibiotic substance as in claim 1, said antibiotic substance being 7-(5'-chloro-2'-methylphenylmercaptoacetamido)cephalosporanic acid.

5. An antibiotic substance as in claim 1, said antibiotic substance being 7-(2',4'-dichlorophenylmercaptoacetamidocephalosporanic acid.

6. An antibiotic substance as in claim 1, said antibiotic substance being 7-p-bromophenylmercaptoacetamidocephalosporanic acid.

7. An antibiotic substance as in claim 1, said antibiotic substance being 7-p-bromophenylmercaptoacetamidocephalosporanic acid.

8. An antibiotic substance as in claim 1, said antibiotic substance being 7-o-chlorophenylmercaptoacetamidocephalosporanic acid.

References Cited
UNITED STATES PATENTS

| | | | |
|---|---|---|---|
| 3,079,305 | 2/1963 | Kaufmann et al. | 260—239.1 |
| 3,079,306 | 2/1963 | Offe et al. | 260—239.1 |
| 3,173,916 | 3/1965 | Shull et al. | 260—243 |
| 3,202,656 | 8/1965 | Abraham et al. | 260—243 |
| 3,207,755 | 9/1965 | Abraham et al. | 260—243 |
| 3,222,362 | 12/1965 | Flynn | 260—243 |

OTHER REFERENCES

Burger: Medicinal Chemistry (2nd ed.), by Interscience Publishers, Inc., New York, pp. 74 to 78, 1960. RS403B8, 1960.

Yale et al.: Jour. Medicinal and Pharmaceutical Chemistry, vol. 1, No. 2, pp. 121 to 133, 1959.

NICHOLAS S. RIZZO, *Primary Examiner.*

ALEX MAZEL, *Examiner.*

J. W. ADAMS, *Assistant Examiner.*